United States Patent
Hornick et al.

(12) 
(10) Patent No.: US 7,031,978 B1
(45) Date of Patent: Apr. 18, 2006

(54) PROGRESS NOTIFICATION SUPPORTING DATA MINING

(75) Inventors: Mark F. Hornick, Waltham, MA (US); Pavani Kuntala, Nashua, NH (US); Gary Drescher, Cambridge, MA (US); Chitra Bhagwat, Burlington, MA (US); Marcos Campos, Cambridge, MA (US); Joe Yarmus, Groton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 647 days.

(21) Appl. No.: 10/146,821

(22) Filed: May 17, 2002

(51) Int. Cl.
*G06F 17/30* (2006.01)

(52) U.S. Cl. .................................. 707/103 R
(58) Field of Classification Search ............ 707/1, 707/10, 103 R
See application file for complete search history.

(56) References Cited

U.S. PATENT DOCUMENTS

| | | | | |
|---|---|---|---|---|
| 5,574,898 A | * | 11/1996 | Leblang et al. | 707/1 |
| 5,758,147 A | * | 5/1998 | Chen et al. | 707/6 |
| 6,112,194 A | * | 8/2000 | Bigus | 706/11 |
| 6,356,917 B1 | * | 3/2002 | Dempsey et al. | 707/202 |
| 6,656,118 B1 | * | 12/2003 | Sharma et al. | 600/437 |

\* cited by examiner

*Primary Examiner*—Jack M. Choules
(74) *Attorney, Agent, or Firm*—Swidler Berlin LLP

(57) ABSTRACT

The present invention relates to progress notification systems, computer program products and methods of operation thereof, that reports processing progress of data mining operations at regular periodic intervals. The system comprises: an input/output interface for exchanging information with a network; a memory for storing updated progress objects associated with the data mining operation as a set of data mining algorithms progress in processing; and a processor coupled to the input/output interface and the memory, the processor for performing the data mining operation, the data mining operation implementing the set of data mining algorithms; and generating a notification object for the data mining operation at a pre-determined interval, the notification object based on the progress objects at each of the pre-determined intervals.

33 Claims, 8 Drawing Sheets

PROGRESS NOTIFICATION SUPPORTING DATA MINING

BACKGROUND OF THE INVENTION

1. Field of the Invention

The present invention relates to a method, system and computer program product for providing application progress. More particularly, the present invention relates to a progress notification system for reporting processing progress of multi-threaded data mining operations at regular intervals.

2. Description of the Prior Art

Generally, software that performs computation intensive tasks, such as data mining operations implementing data analysis algorithms, provided progress notification in order to inform users of how far the algorithms have progressed in their processing. Current methods of reporting how far algorithms have progressed in their processing don't allow users to manage their time or system resources as effectively as they could. It can also leave users frustrated. Current methods of progress reporting instrument the algorithms in such a way that reporting frequency depends on data size and characteristics. One of the reasons for this is that the frequency of reporting on how far algorithms have progressed in their processing can vary significantly. This occurs as a result of (1) variations in the size of data sets on which processing is being performed and (2) type of algorithm selected, and specific user-provided algorithm parameters. Also, reporting of progress for larger data sets occurs with less frequency than reporting of progress for smaller data sets.

Another reason current methods leave users frustrated is that inaccurate reporting of how far algorithms have progressed in their processing takes place. Inaccurate progress reporting occurs when an estimate of how long a processing activity should take is utilized to determine the actual progress of processing activity, but the estimate is incorrect or the processing completes faster or slower than the estimate. Accordingly, reported progress of processing activity can differ substantially from the actual progress of the processing activity.

An additional reason for leaving users frustrated is the lack of descriptive and detailed information provided to users regarding how far algorithms have progressed in their processing. The information regarding how far algorithms have progressed is generally limited to percentage of processing completed. Accordingly, a user is not adequately informed to facilitate an understanding of the various algorithms' states of processing.

Accordingly, there is a need for a progress notification system for data mining operations. There is an additional need for the progress notification system to report progress at regular intervals, independent of data mining analysis algorithms. There is also a need for the progress notification system to report progress with accuracy. There is a further need for the progress notification system to provide detailed descriptive information pertaining to progress. There is an additional need for the progress notification system to operate with algorithms that are multi-threaded.

SUMMARY OF THE INVENTION

Based on the above and foregoing, it can be appreciated that there presently exists a need in the art for a progress notification system which overcomes the above-described deficiencies. The present invention was motivated by a desire to overcome the drawbacks and shortcomings of present progress reporting systems, and thereby, fulfill this need in the art The present invention relates to progress notification system, computer program product and method of operation thereof, that reports processing progress of data mining operations at regular periodic intervals. The progress notification system of the present invention provides users with more detailed information at regular intervals to facilitate users ability to make decisions related to data mining operations in progress.

In accordance with the present invention, the progress notification system comprises an input/output interface for exchanging information with a network, a memory for storing updated progress objects associated with the data mining operation as the one or more data mining algorithms progress in processing progress and a processor coupled to the input/output interface and the memory. The processor performs the data mining operation, the data mining operation implementing one or more the data mining algorithms and generating a notification object for the data mining operation at pre-determined intervals. The notification object is based on the progress objects at each of the pre-determined intervals.

In an aspect of the present invention, the processor accumulates the progress objects at each of the pre-determined intervals. At least one progress object is associated with each of the one or more data mining algorithms. The processor determines a level of progress characterized by each of the progress objects. The level of progress characterized by each of the progress objects is defined by one of the one or more data mining algorithms.

In an aspect of the present invention, the system further comprises the processor converting the notification object into an XML string.

In an aspect of the present invention, the system further comprises a database coupled to the input/output interface for enqueuing the XML string into a table.

In an aspect of the present invention, the system further comprises the database providing the XML string in response to a query of the table. The query of the table includes an ID for a request to perform the data mining operation.

The aspects of the present invention that offer these capabilities are described in detail hereinafter with reference to the accompanying figures, which illustrate exemplary embodiments thereof.

BRIEF DESCRIPTION OF THE DRAWINGS

The details of the present invention, both as to its structure and operation can best be understood by referring to the following description with reference to the accompanying drawings in which.

DETAILED DESCRIPTION OF THE INVENTION

Figure 1:
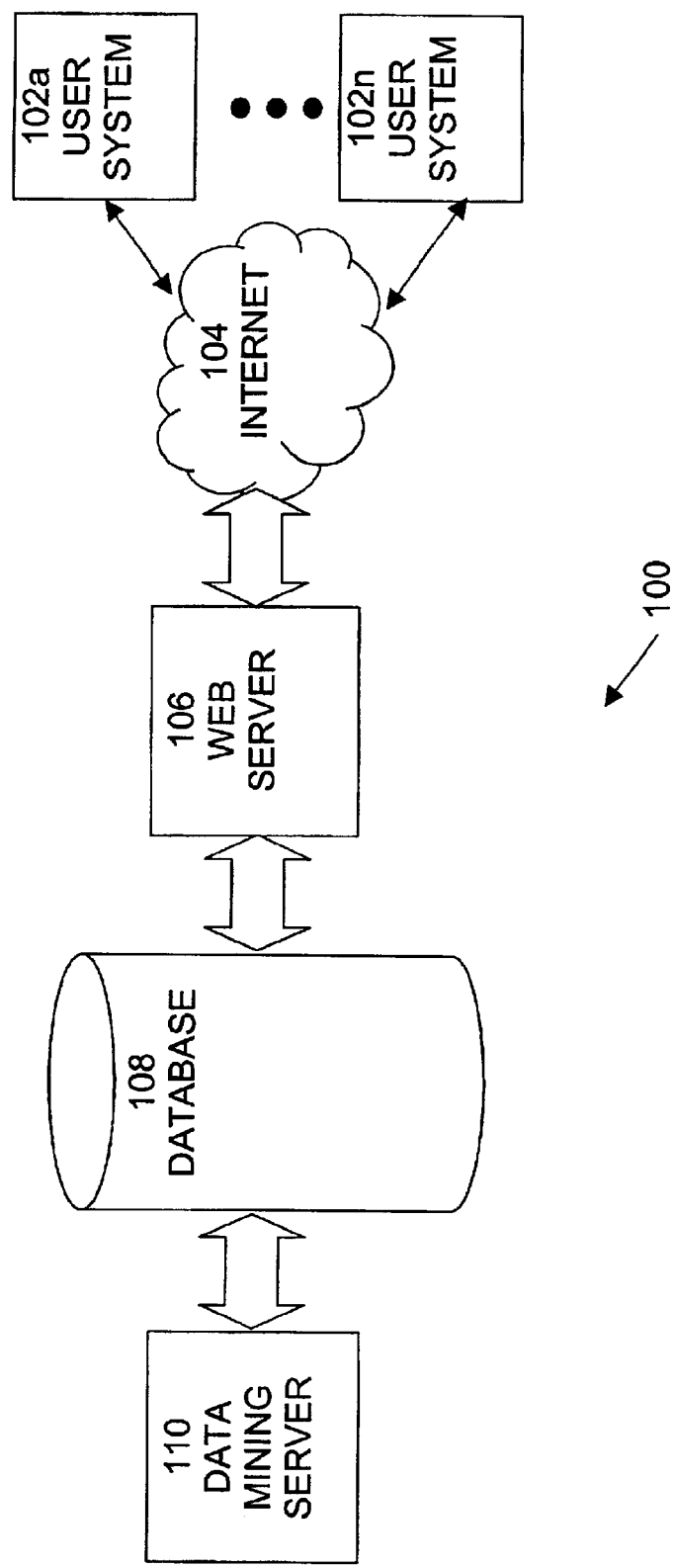
FIG. 1 is an exemplary block diagram of a system incorporating the present invention.

A block diagram of an exemplary embodiment of system 100 incorporating the present invention is shown in FIG. 1. In the FIG. 1 embodiment, system 100 includes a plurality of systems 102a–102n. The systems 102a–102n may be personal computer systems operated by users. Systems 102a–102n are communicatively coupled to a data communications network, such as the Internet 104. Systems 102a–102n generate and transmit requests for information over Internet 104 to system 106. Requests for information are generally generated by browser software running on user systems 102a–102n in response to an event, such as input from users. Requests for information are received and processed by system 106. Responses are transmitted from system 106 to the user systems 102a–102n in accordance with the processed request for information. One having ordinary skill in the art would will recognize that the present invention applies equally to data mining servers 110 that can support direct interaction with user systems 102 as with data mining servers 110 that indirectly interact with user systems 102 using database 108.

In the FIG. 1 embodiment, Data Mining Database system 108 is communicatively connected to system 106 and receives requests for information relating to the requests for information received by system 106 from the user systems 102a–102n. Data Mining Database system 108 maintains data mining metadata defined by a data mining schema. The requests for information received by Data Mining Database system 108 are constructed as an Extensible Markup Language (XML) string. However, any scalable representation for communicating requests is acceptable. XML is an open standard used for defining data elements on a Web page and business-to-business documents. The structure of the XML string is defined by Document Type Definition (DTD). The requests for information received by system 108 may include the actual requests for information received by system 106, it may include modified requests for information relating to the requests for information received by system 106, which has been processed or generated by system 106, or it may include requests for information generated by system 106 itself. System 108 processes the received information and responds appropriately. System 108 receives progress information pertaining to the processing of the received information. The progress information received is constructed as an XML string. The progress information is placed in a data structure, such as a table, of system 108. Responses are transmitted from system 108 to systems 102 in accordance with the processed request for information.

In the FIG. 1 embodiment, Data Mining system 110 is communicatively connected to system 108 and receives requests for information relating to the requests for information received by database 108 from system 106. Received requests for information are processed by system 110. Processing includes parsing XML strings, in which the requests for information are packaged, as appropriate and then dispatching the requests to the appropriate data mining algorithms to perform data mining operations. Each of the data mining algorithms may include various sub-routines that perform specific processing functions necessary to perform the computation for which the algorithm is designed. Responses corresponding to the results of the performed data mining operations are transmitted from system 110 to system 108. The responses are constructed as an XML string. One having ordinary skill in the art would recognize the scalability of system 100, wherein one or more of systems 106, 108, and 110 can be added, alone or in combination, to increase user load as well as processing of requests.

Figure 2:
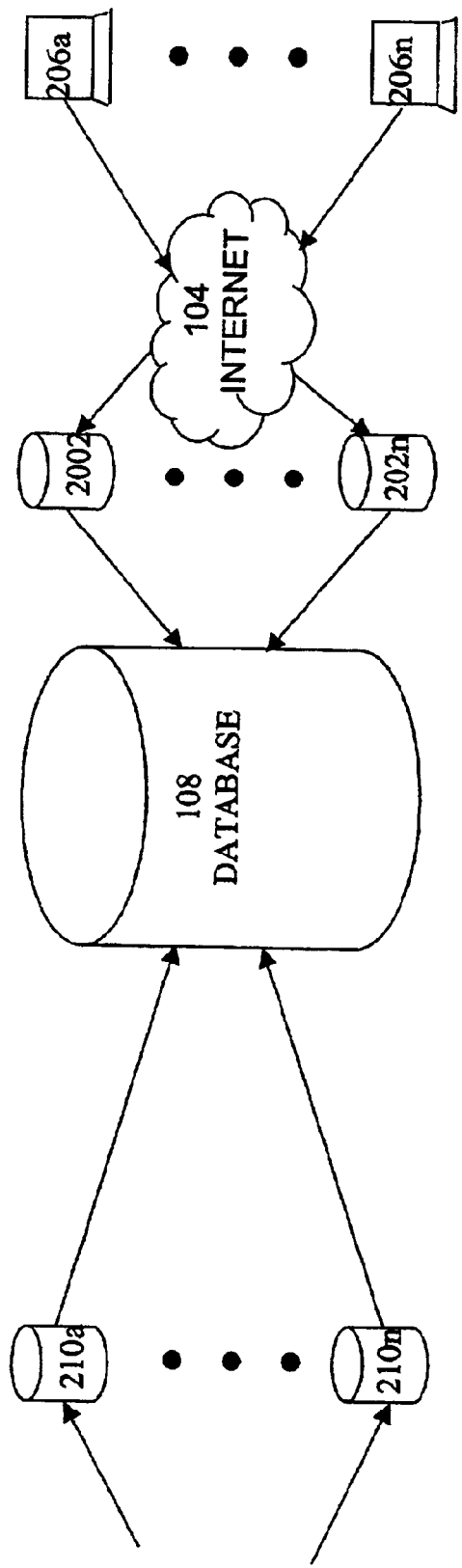
FIG. 2 is an exemplary block diagram of a system, according to the present invention.

An exemplary block diagram of a data mining system, in which the present invention may be incorporated, is shown in FIG. 2. As shown in FIG. 2, the present invention includes database system 108 connected to a variety of sources of data. System 108 connects to a number of data sources, such as systems 210a–210n and 204a–204n. System 210a–210n includes data sources inaccessible to the public, such as proprietary or internal data sources. Systems 204a–204n includes data sources accessible to the public, such as over the Internet, privately accessible, such as implementing secure connection technology, or a combination thereof. Each of the systems connected to database 202 are potential sources of data for database 208. The data provided by systems 204a–204n and 210a–210n may be of any type and in any format. System 108 may utilize the data in systems 204a–204n and 210a–210n to build models for data mining.

Figure 3:
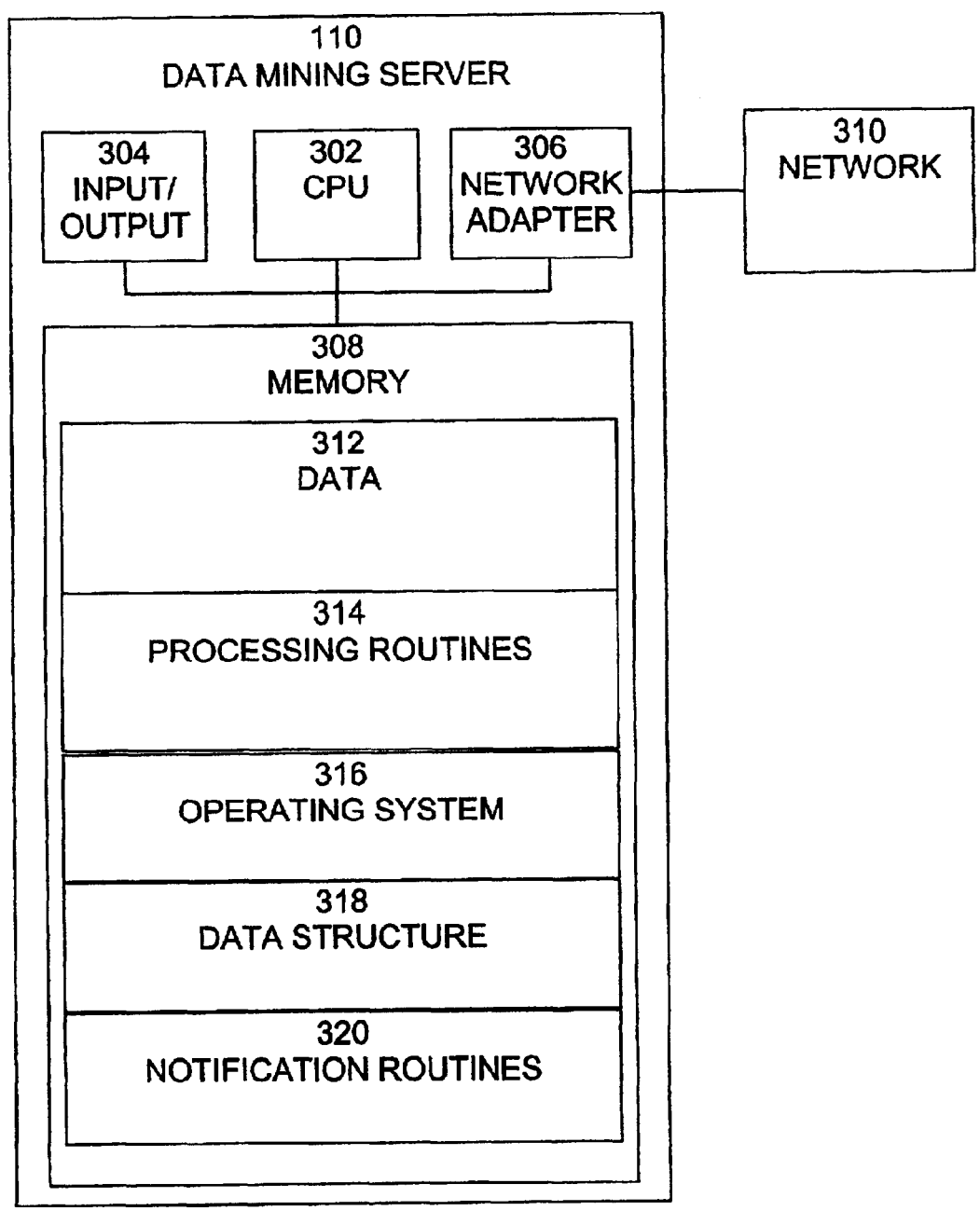
FIG. 3 is an exemplary block diagram of a data mining system shown in FIG. 1.

An exemplary block diagram of a data mining system 110 is shown in FIG. 3. Data mining system 110 is typically a programmed general-purpose computer system, such as a personal computer, workstation, system system, and minicomputer or mainframe computer. Data mining system includes processor (CPU) 302, input/output circuitry 304, network adapter 306, and memory 308. CPU 302 executes program instructions in order to carry out the functions of the present invention. Typically, CPU 302 is a microprocessor, such as an INTEL PENTIUM® processor, but may also be a minicomputer or mainframe computer processor. Input/output circuitry 304 provides the capability to input data to, or output data from, data mining system 110. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces data mining system 110 with network 310. Network 310 may be any standard local area network (LAN) or wide area network (WAN), such as Ethernet, Token Ring, the Internet, or a private or proprietary LAN/WAN.

Memory 308 stores program instructions that are executed by, and data that are used and processed by, CPU 302 to perform the data mining functions of the present invention. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes data 312, processing routines 314, operating system 316, data structure 318 and notification routine 320. Data 312 includes data that has been retrieved from a database system, such as system 108 shown in FIG. 1, and which is used for data mining functions. Processing routines 314 are data mining algorithms that implement the data mining processing performed by the present invention and execute in parallel. Each data mining algorithm may be multi-threaded having various sub-routines that execute concurrently. Operating system 316 provides overall system functionality. Data structure 318 is a tree-like structure that stores up to date progress information pertaining to the data mining algorithms as they perform data mining operation processing. Notification routine 320 is a function provided as a software routine that implements the progress notification performed by the present invention. Notification routine includes a timer that defines the frequency of progress notification. The value for the timer may be obtained from a configuration file or other suitable interface.

Figure 4:
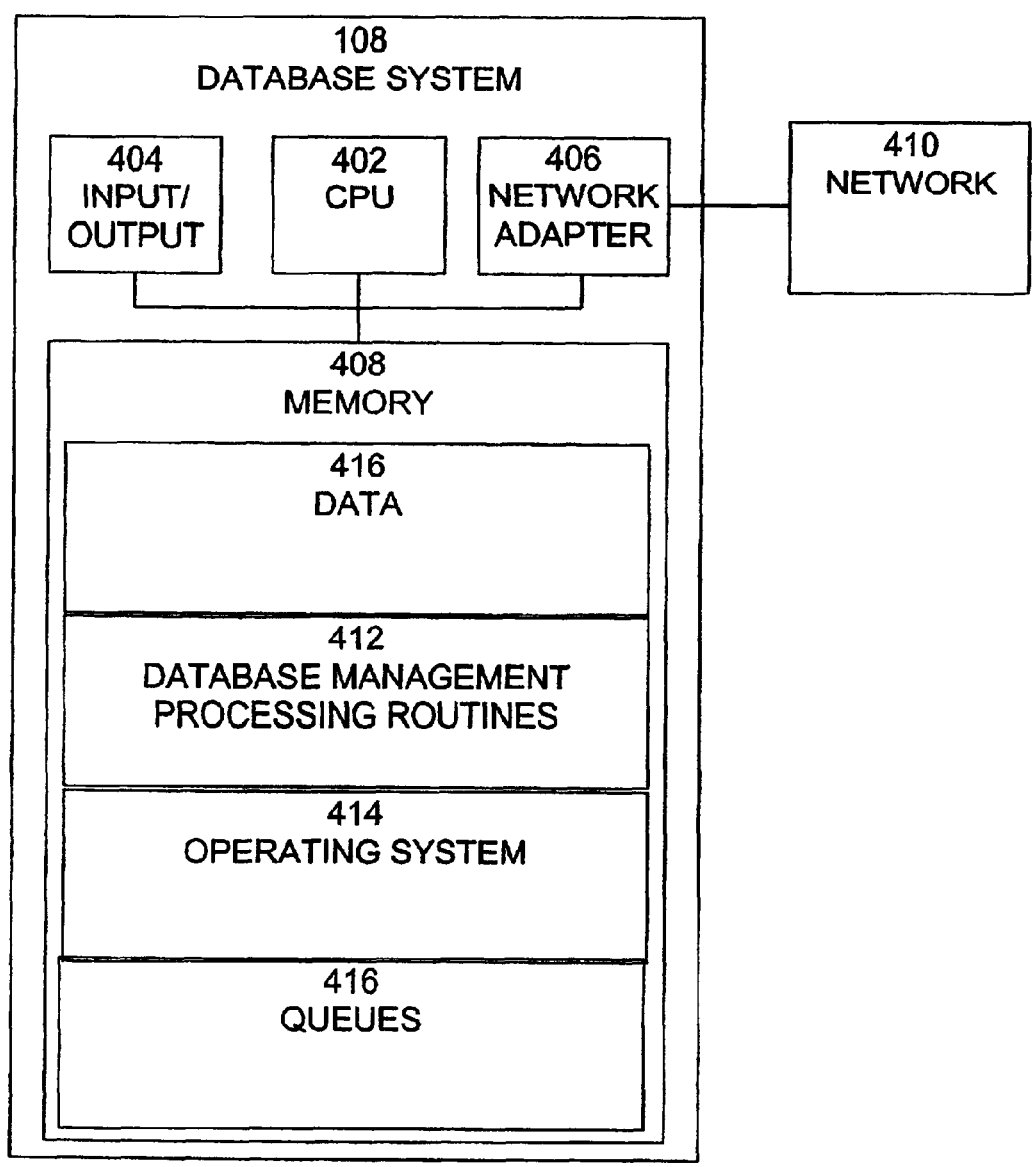
FIG. 4 is an exemplary block diagram of a database system shown in FIG. 1.

An exemplary block diagram of a database system 108 is shown in FIG. 4.

Database system 108 is typically a programmed general-purpose computer system, such as a personal computer, workstation, system system, and minicomputer or mainframe computer. Database management system includes processor (CPU) 402, input/output circuitry 404, network adapter 406, and memory 408. CPU 402 executes program instructions in order to carry out the functions of the present invention. Typically, CPU 402 is a microprocessor, such as an INTEL PENTIUM® processor, but may also be a minicomputer or mainframe computer processor. Input/output circuitry 404 provides the capability to input data to, or output data from, database system 108. For example, input/output circuitry may include input devices, such as keyboards, mice, touchpads, trackballs, scanners, etc., output devices, such as video adapters, monitors, printers, etc., and input/output devices, such modems, etc. Network adapter 406 interfaces database (LAN) system 108 with network 410. Network 410 may be any standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform data mining functions of the database system 108. Memory 408 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 408 includes data 416, database management processing routines 412, and operating system 414. Data 416 includes mining metadata defined by a data mining schema. Database management processing routines 412 are software routines that provide database management functionality, such as database query processing.

Operating system 414 provides overall system functionality. Queues 416 may include a response queue, a request queue, an interrupt queue and a request status information table. Queues 416 are storage spaces in memory that contain information pertaining to processing.

Figure 5:
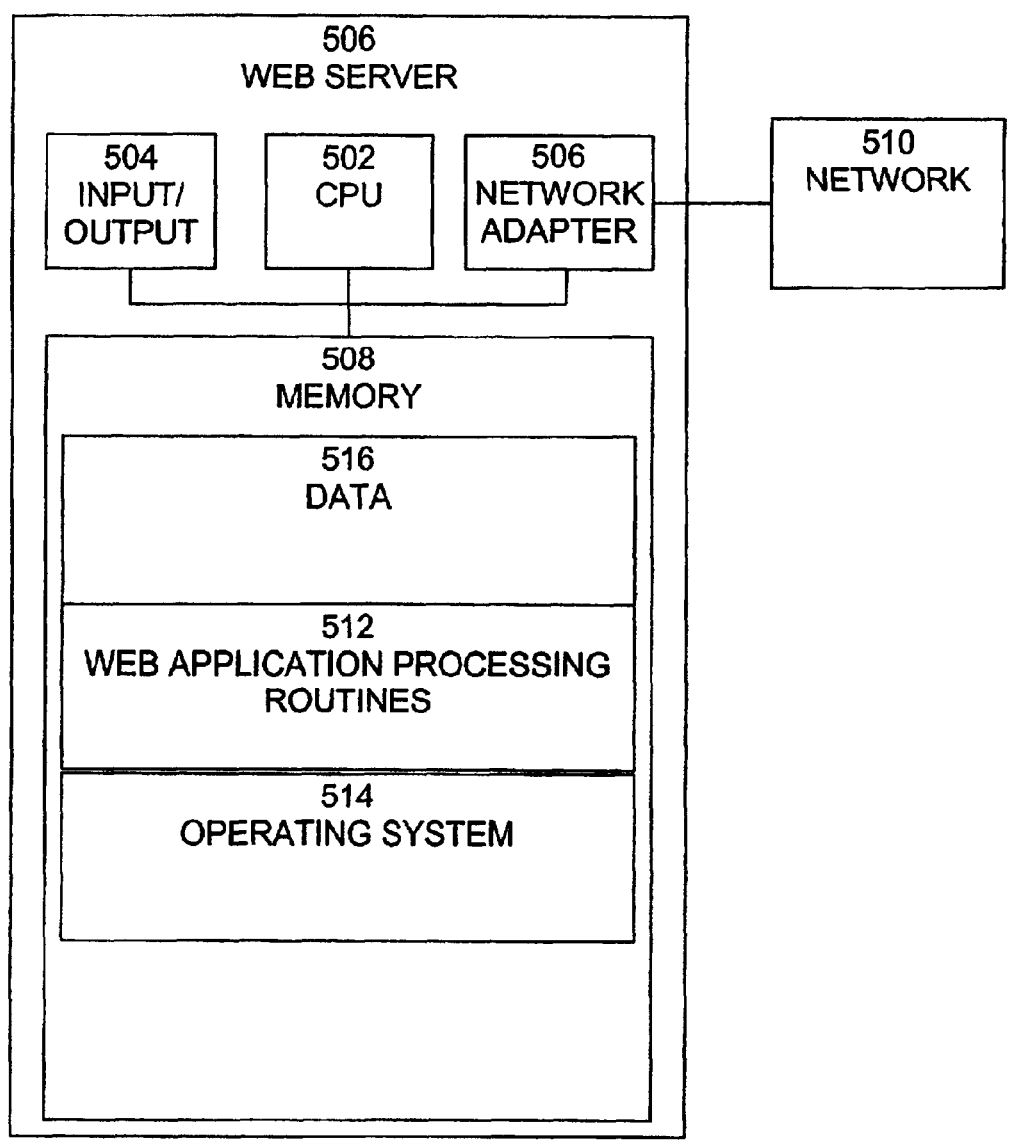
FIG. 5 is an exemplary block diagram of a system shown in FIG. 1.

An exemplary block diagram of a system 106 is shown in FIG. 5. In the embodiment of FIG. 5, system 106 is a web server, but may be any client system that can access the database 108, for example, using a Java API. System 106 is typically a programmed general-purpose computer system, such as a personal computer, workstation, system, and minicomputer or mainframe computer. Web system 506 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Input/output circuitry 504 provides the capability to input data to, or output data from, Web system 106. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces Web system 506 with network 510. Network 510 may be any standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of the database system 108. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 508 includes data 516, web application processing routines 512, and operating system 514. Data 406 includes data collected from a user system, such as system 102, System's 106 API and third party products. Web application processing routines 512 are software routines that provide data mining functionality, such as managing request for access to information and collecting data. Operating system 514 provides overall system functionality.

Figure 6:
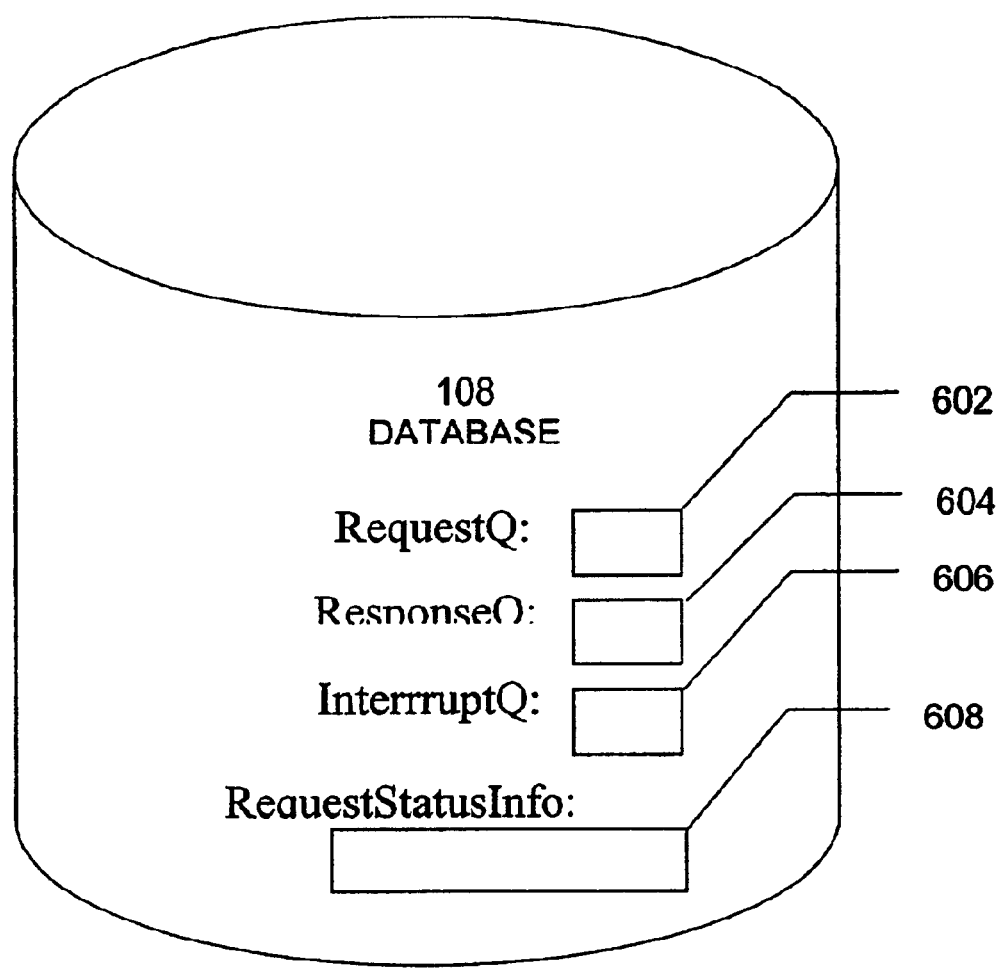
FIG. 6 is an exemplary block diagram of queues in the database system shown in FIG. 1.

An exemplary embodiment of queues 616 in a database system 108 is shown in FIG. 6. In the embodiment shown in FIG. 6, queues 416 provided in database 108 include a request queue 602, a response queue 604, an interrupt queue 606, and a status information table 608. Request queue 602 contains requests from system 106, as provided by the Java API of system 106, for processing by data mining system 110. Response queue 604 contains the result of a data mining operation performed by data mining system 110. Interrupt queue 606 contains requests from the Java API to stop processing a request with a given message ID. Status information table 808 contains the latest status and/or progress for a given data mining operation. The Java API can query this table with a specific messageID to obtain the XML string providing the latest status and/or progress for a given data mining operation.

Figure 7:
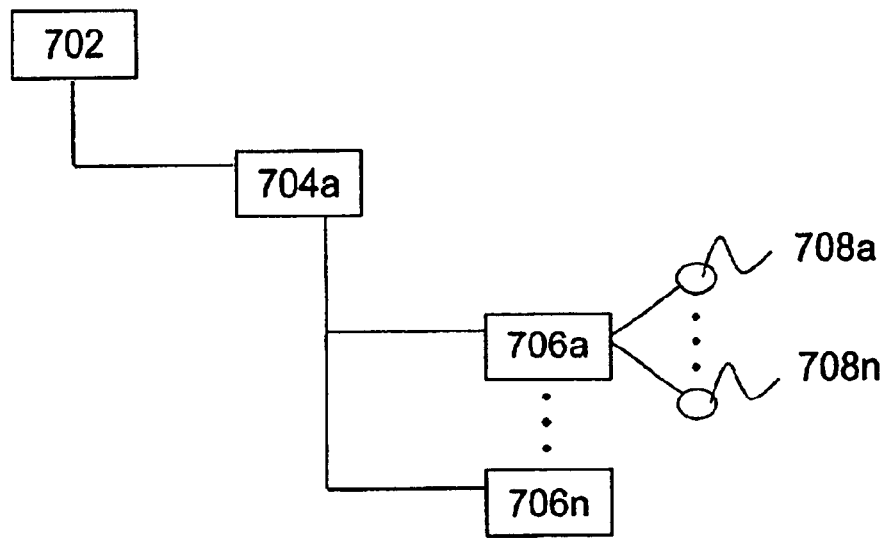
FIG. 7 is an exemplary illustration of a data structure in data mining system shown in FIG. 1.
Figure 7:
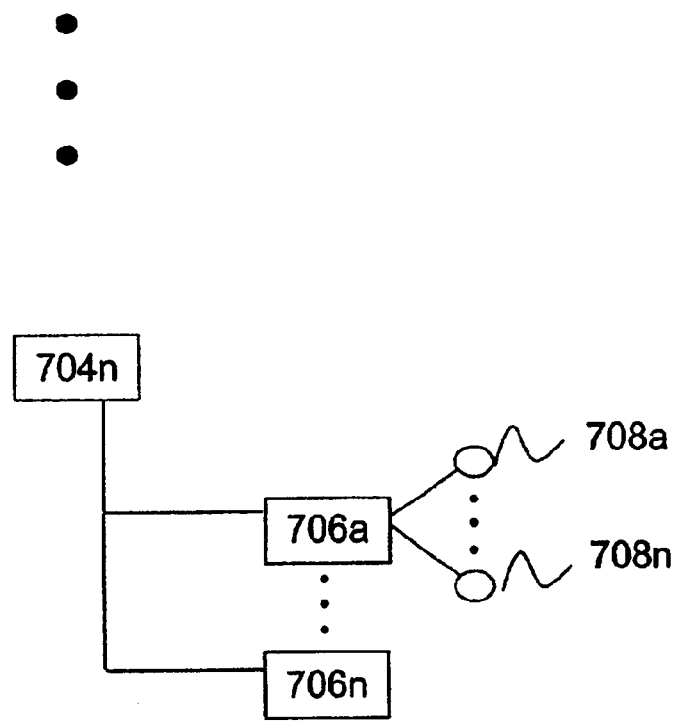

An exemplary embodiment of data structure 318 in data mining system 110 is shown in FIG. 7. Data structure 318 obtains information, from each data analysis algorithm executing during a data mining operation, that defines the progress of the data mining operation. In the embodiment shown in FIG. 7, data structure includes a root node 702, parent nodes 704a–704n, child nodes 706a–706n and descriptive progress parameters 708a–708n. Root node 702 represents an overall data mining operation. Each parent node 704 represents a data analysis algorithm executing during the data mining operation. A child node 706 of a parent node 704 represents a thread executing for the data analysis algorithm represented by the parent node 704. A descriptive progress parameter 708 of a child node 706 defines the progress of the thread represented by the child node 706. A number of descriptive parameters 708 may be obtained for a child node 706. Each of the descriptive progress parameters 708 obtained for the child node 706 may define the progress of the thread, represented by the child node 706, at a different level of descriptive detail. Descriptive parameters 708 are updated periodically by each of the data analysis algorithms represented by parent nodes 704. The frequency in which the parameters 708 are updated maybe based on a period of time and the completion of a processing operation corresponding to levels of descriptive detail.

Figure 8:
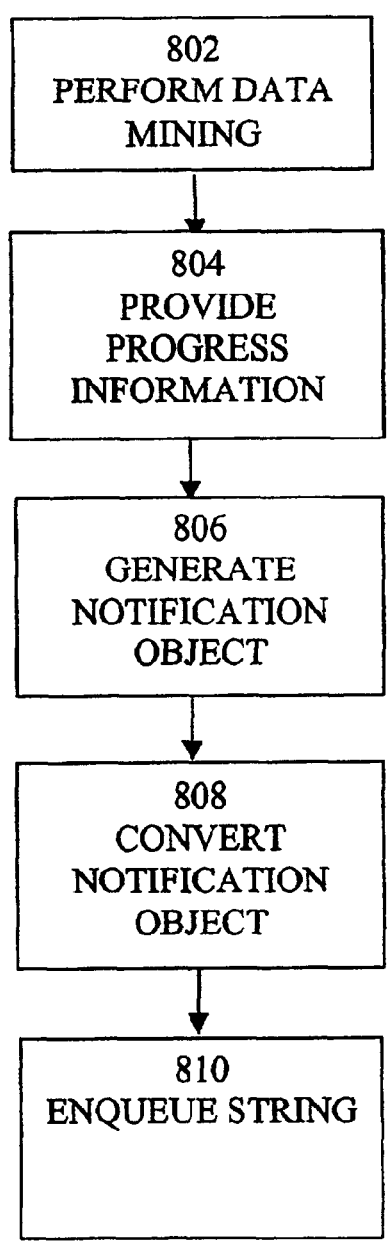
FIG. 8 is an exemplary flow diagram of a process for progress notification implemented by the present invention.

An exemplary flow diagram of a process for progress notification implemented by the present invention is shown in FIG. 8. In the embodiment of FIG. 8, the process begins with step 802, in which a data mining operation is being performed by data mining system 110. The performance of the data mining operation may be triggered by a request generated by system 106. The data mining operation may implement a set of data mining algorithms. Each of the data mining algorithms may execute a set of threads that operate concurrently. In step 804, each of the threads provides progress information to a data structure.

The progress information is provided as parameters that characterize and define the progress of the thread in its processing. Each thread may provide a set progress parameters, each of varying detail. The progress information is updated frequently at a pre-determined interval. In an embodiment of the present invention, progress parameters for a thread can include a number representing the computational iterations performed on a data set, a percentage representing the computational iterations performed on the data set, a percentage representing the errors that occurred during the computation, a number representing the number of errors that occurred during the computation, a number representing the number of records in the data set that have been completed for the current iteration, a percentage representing the number of records in the data set that have been completed for the current iteration, the overall time elapsed during the computation and the time elapsed for each iteration completed.

The number representing the computational iterations performed characterizes the number of complete passes the thread has made through the data set as an integer value for algorithms that require multiple passes, such as neural networks. The number representing the computational iterations performed characterizes the number of complete passes the thread has made through the data set as a percentage value. The percentage representing the errors that occurred during the computation characterizes the number of errors as a percentage value. The number representing the number of errors that occurred during the computation characterizes errors as an integer value. The number representing the number of records in the data set that have been completed for the current iteration characterizes the records completed as integer values. The percentage representing the number of records in the data set that have been completed for the current iteration characterizes the records completed as a percentage value. The overall time elapsed during the computation characterizes how long the data mining algorithm has been processing, such as in minutes and seconds. The time elapsed for each iteration completed characterizes how long each iteration took to process, such as in minutes and seconds.

In step 806, a notification object is generated by notification routine 320. The notification routine 320 generates a notification object at a pre-determined interval. The notification object is based on the progress parameters in the data structure at each of the intervals. The notification object summarizes the characterizations of the progress objects. In an embodiment of the present invention, the summary characterized by the notification object may include an overall percentage value representing how much processing has been completed based on the numbers (counts) of processing performed by each thread, a number representing the processing completed by each thread, identification of a thread processing the slowest, total number of iterations needed to be performed, total number of records to be processed, total time elapsed during processing and an estimated time for completion. The integer, percentage and time values of the summary object are all derived through calculation based on the integer, percentage and time values of the progress objects.

Returning again to FIG. 8. In step 808, the notification object is converted into an XML string by the notification routine. In step 810, the XML string is enqueued in table 608. Table 608 may be queried using a request ID to obtain the progress of the data mining operation for display.

The present invention is described hereinabove with reference to flowchart illustrations of methods, apparatus (systems), methods of doing business and computer program products according to the invention. It will be understood that each block of the flowchart illustrations, and combinations of blocks in the flowchart illustrations, can be implemented by computer program instructions. These computer program instructions may be loaded onto a general-purpose computer, special purpose computer, or other programmable data processing apparatus to produce a machine. These computer program instructions, which execute on the computer or other programmable data processing apparatus, create means for implementing the functions specified in the flowchart block or blocks. These computer program instructions may be stored in a computer-readable memory to direct a computer or other programmable data processing apparatus to function in a particular manner, producing an article of manufacture including instruction means which implement the function specified in the flowchart block or blocks. The computer program instructions may also be loaded onto a computer or other programmable data processing apparatus to cause a series of operational steps to be performed, producing a computer implemented process, such that the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of reporting operation progress for dispatched data mining operations, the method comprising:
    performing a data mining operation, the data mining operation implementing a set of data mining algorithms;
    storing at least one progress object for each data mining algorithm in the set of data mining algorithms at a first pre-determined interval as the set of data mining algorithms progress in processing; and
    generating a notification object at a second pre-determined interval, the notification object based on the progress objects stored at the first pre-determined interval;
    wherein the notification object defines a summary characterization of progress.

2. The method according to claim 1, wherein generating the notification object includes accumulating the progress objects at the first pre-determined interval.

3. The method according to claim 2, wherein each of the data mining algorithms in the set of data mining algorithms is associated with a set of progress objects.

4. The method according to claim 3, wherein accumulating the progress objects includes determining a level of progress characterized by each of the progress objects to generate a summary characterization of progress.

5. The method according to claim 4, wherein the level of progress characterized by each of the progress objects is defined by a data mining algorithm in the set of data mining algorithms.

6. The method according to claim 1, further comprising converting the notification object into an XML string.

7. The method according to claim 1, further comprising enqueuing the XML string into a table.

8. The method according to claim 1, further comprising providing the XML string in response to a query of the table.

9. The method according to claim 8, wherein the query of the table includes an ID for a request to perform the data mining operation.

10. The method according to claim 1, wherein the progress objects characterize progress as any combination of: percentage values, integer values, time values and explanatory text.

11. The method according to claim 1, wherein the notification object characterizes overall progress as any combination of: percentage values, integer values, time values and explanatory text.

12. A system for reporting operation progress for dispatched data mining operations, the system comprising:
    an input/output interface for exchanging information with a network;
    a memory for storing at least one progress object for each data mining algorithm in the set of data mining algorithms at a first pre-determined interval as the set of data mining algorithms progress in processing; and
    a processor coupled to the input/output interface and the memory, the processor for:
        performing the data mining operation, the data mining operation implementing the one or more data mining algorithms; and
        generating a notification object at a second pre-determined interval, the notification object based on the progress objects stored at the first pre-determined interval;
    wherein the notification object defines a summary characterization of progress.

13. The system according to claim 12, wherein generating the notification object includes the processor accumulating the progress objects at the first pre-determined interval.

14. The system according to claim 13, wherein each of the one or more data mining algorithms is associated with at least one progress object.

15. The system according to claim 14, wherein accumulating the progress objects includes the processor determining a level of progress characterized by each of the progress objects.

16. The system according to claim 15, wherein the level of progress characterized by each of the progress objects is defined by a one of the one or more data mining algorithms.

17. The system according to claim 12, further comprising the processor converting the notification object into an XML string.

18. The system according to claim 12, further comprising a database coupled to the input/output interface for enqueuing the XML string into a table.

19. The system according to claim 12, further comprising the database providing the XML string in response to a query of the table.

20. The system according to claim 19, wherein the query of the table includes an ID for a request to perform the data mining operation.

21. The system according to claim 12, wherein the progress objects characterize progress as any combination of: percentage values, integer values, time values and explanatory text.

22. The system according to claim 12, wherein the notification object characterizes overall progress as any combination of: percentage values, integer values, time values and explanatory text.

23. A computer program product for reporting operation progress of dispatched data mining operations, the computer program product comprising:
    a computer readable medium;
    computer program instructions, recorded on the computer readable medium, executable by a processor, for performing the steps of:
        performing a data mining operation, the data mining operation implementing one or more data mining algorithms;
        storing at least one progress object for each data mining algorithm in the set of data mining algorithms at a first pre-determined interval as the set of data mining algorithms progress in processing; and
        generating a notification object at a second pre-determined interval, the notification object based on the progress objects stored at the first pre-determined interval;
    wherein the notification object defines a summary characterization of progress.

24. The computer program product according to claim 23, wherein generating the notification object includes accumulating the progress objects the first pre-determined interval.

25. The computer program product according to claim 24, wherein each of the one or more data mining algorithms is associated with at least one progress object.

26. The computer program product according to claim 25, wherein accumulating the progress objects includes determining a level of progress characterized by each of the progress objects.

27. The computer program product according to claim 26, wherein the level of progress characterized by each of the progress objects is defined by a one of the one or more data mining algorithms.

28. The computer program product according to claim 23, further comprising computer program instructions for performing the step of converting the notification object into an XML string.

29. The computer program product according to claim 23, further comprising computer program instructions for performing the step of enqueuing the XML string into a table.

30. The computer program product according to claim 23, further comprising computer program instructions for performing the step of providing the XML string in response to a query of the table.

31. The computer program product according to claim 30, wherein the query of the table includes an ID for a request to perform the data mining operation.

32. The computer program product according to claim 23, wherein the progress objects characterize progress as any combination of: percentage values, integer values, time values and explanatory text.

33. The computer program product according to claim 23, wherein the notification object characterizes overall progress as any combination of: percentage values, integer values, time values and explanatory text.

\* \* \* \* \*